Nov. 1, 1927.	1,647,177
P. HERBST
SELF ALIGNING GEAR
Filed Sept. 22, 1924
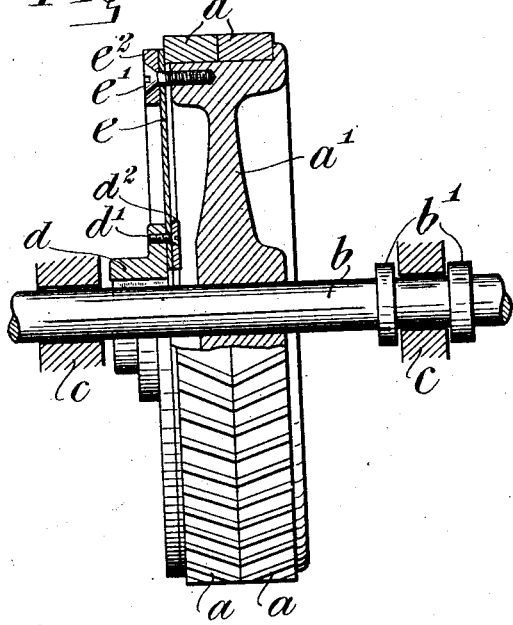
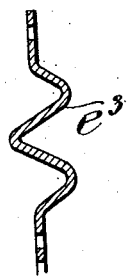
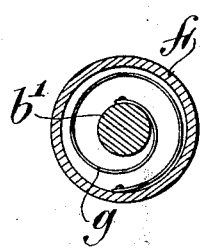
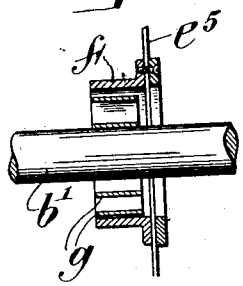
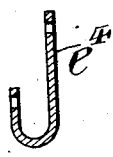
Peter Herbst Inventor
By his Attorneys
Redding, Greeley & Shent Campbell Patented Nov. 1, 1927.

1,647,177

UNITED STATES PATENT OFFICE.

PETER HERBST, OF HOLTE, DENMARK, ASSIGNOR TO F. L. SMIDTH & CO., OF NEW YORK, N. Y., A CORPORATION OF NEW JERSEY.

SELF-ALIGNING GEAR.

Application filed September 22, 1924, Serial No. 738,975, and in Denmark September 29, 1923.

In the transmission of rotary motion by gears which have teeth of such shape, as double helical teeth, for example, that there is a component of tooth pressure in an axial direction, it is often desirable that the gear itself shall be capable of limited movement in an axial direction with as little resistance as possible. In the case of gears with double helical teeth it is of great importance that the symmetric planes of two co-acting gears, at right angles to the shafts on which the gears are mounted, shall coincide and that one or the other of such gears shall be capable of movement in an axial direction in order that it shall be self-aligning.

In gearing in which at least one of the co-acting gears is splined on its shaft so as to be movable in an axial direction for the purpose stated, considerable resistance to the movement on the shaft is due to the friction between the gear and its supporting member and its spline, such resistance being sufficient in some cases to prevent the axial movement of the gear necessary to effect the desired alignment.

The object of the present invention is to provide improved means for effecting operative connection between the gear and its shaft or other supporting device which will transmit the torque between the two elements while permitting the free movement of the gear in an axial direction to a limited extent. In accordance with the invention the torque transmitting member is made as a plate or sheet or diaphragm which, while rigid or unyielding in the plane of rotation, substantially at right angles to the axis of the gear, is resilient or yielding in an axial direction. The invention will be more fully explained hereinafter with reference to the accompanying drawing in which, by way of example, it is illustrated as applied to a gear having double helical teeth, although it is not limited to use with gears having teeth of that particular description. In the drawing—

Figure 1 is a view partly in longitudinal section and partly in elevation of a gear and its supporting shaft to which the invention is applied.

Figures 2 and 3 are detail views in section illustrating different forms of the torque transmitting member.

Figures 4 and 5 are detail views in longitudinal section and transverse section respectively illustrating the application of the invention to a gear which is resiliently or yieldingly connected to the supporting shaft.

In the embodiment of the invention illustrated in Figure 1, the toothed members of the gear are shown as formed with double helical teeth and as mounted on a gear body $a'$ which has a free working fit on its supporting shaft $b$. The latter is shown as mounted in suitable bearings $c$, $c$, and as having collars $b'$ by which it is restrained from longitudinal movement. Keyed on the shaft $b$ is a hub or collar $d$, to which is secured, as by screws $d'$ and a ring $d^2$, a relatively thin sheet or plate or diaphragm $e$ which has sufficient extent in the plane of rotation to be substantially rigid or unyielding in the plane of rotation, and therefore to transmit the torque between the shaft and the gear, but is sufficiently thin to be highly resilient or readily yielding in the direction of the axis of the gear to which it is secured, preferably near the periphery of the gear, as by screws $e'$ and a ring $e^2$. As the gear has a free sliding support on its shaft or supporting means and is not keyed or splined thereon, torque is transmitted from the shaft to the gear or vice versa through the torque transmitting member $e$ alone, but the torque transmitting member at the same time is sufficiently yielding in an axial direction to permit the gear to move axially, under the influence of the axial component of the tooth pressure or otherwise, to align itself properly with the co-acting element.

In the construction shown in Figure 1, the torque transmitting member is shown as a flat sheet, but it may have other desired shapes as shown, for example, at $e^3$ in Figure 2 or at $e^4$ in Figure 3.

The invention may also be applied to a gear connected resiliently to its shaft or supporting member, as shown in Figures 4 and 5, in which the sheet or plate $e^5$ is secured to a hub or sleeve $f$ which is operatively connected to the shaft $b'$ by a spiral spring $g$, so that the gear may yield to a limited extent in the direction of rotation for the purpose of compensating for irregularities in construction or unsteady application of driving power.

Various other embodiments of the invention will readily suggest themselves, and it is to be understood that the invention, except as pointed out in the claims, is not limited to the particular construction shown and described herein.

I claim as my invention:

1. The combination of a gear, a supporting member therefor upon which the gear is supported with freedom for movement in an axial direction, a torque transmitting disc operatively connected to the gear at its periphery, and means mounting the center of the disc upon the supporting member, the said torque transmitting member being substantially rigid in the direction of rotation and yielding in an axial direction to transmit the torque from one element to the other and permit relative movement of the two members in an axial direction.

2. The combination of a gear, a supporting member therefor, means mounting the gear thereon with freedom for movement in an axial direction, and a diaphragm-like torque transmitting member operatively connected to the gear, the torque transmitting member being substantially rigid in the direction of rotation and yielding in an axial direction to transmit the torque from one element to the other and to permit relative movement of the two members in an axial direction, a hub upon which the inner portion of the torque member is mounted, and means resilient in the direction of rotation to connect the hub to the mounting means.

This specification signed this 30th day of August A. D. 1924.

P. HERBST.